April 29, 1969  R. J. HARDIMAN  3,440,869
THREADED FASTENER TESTING APPARATUS
Filed Nov. 4, 1966  Sheet 1 of 2
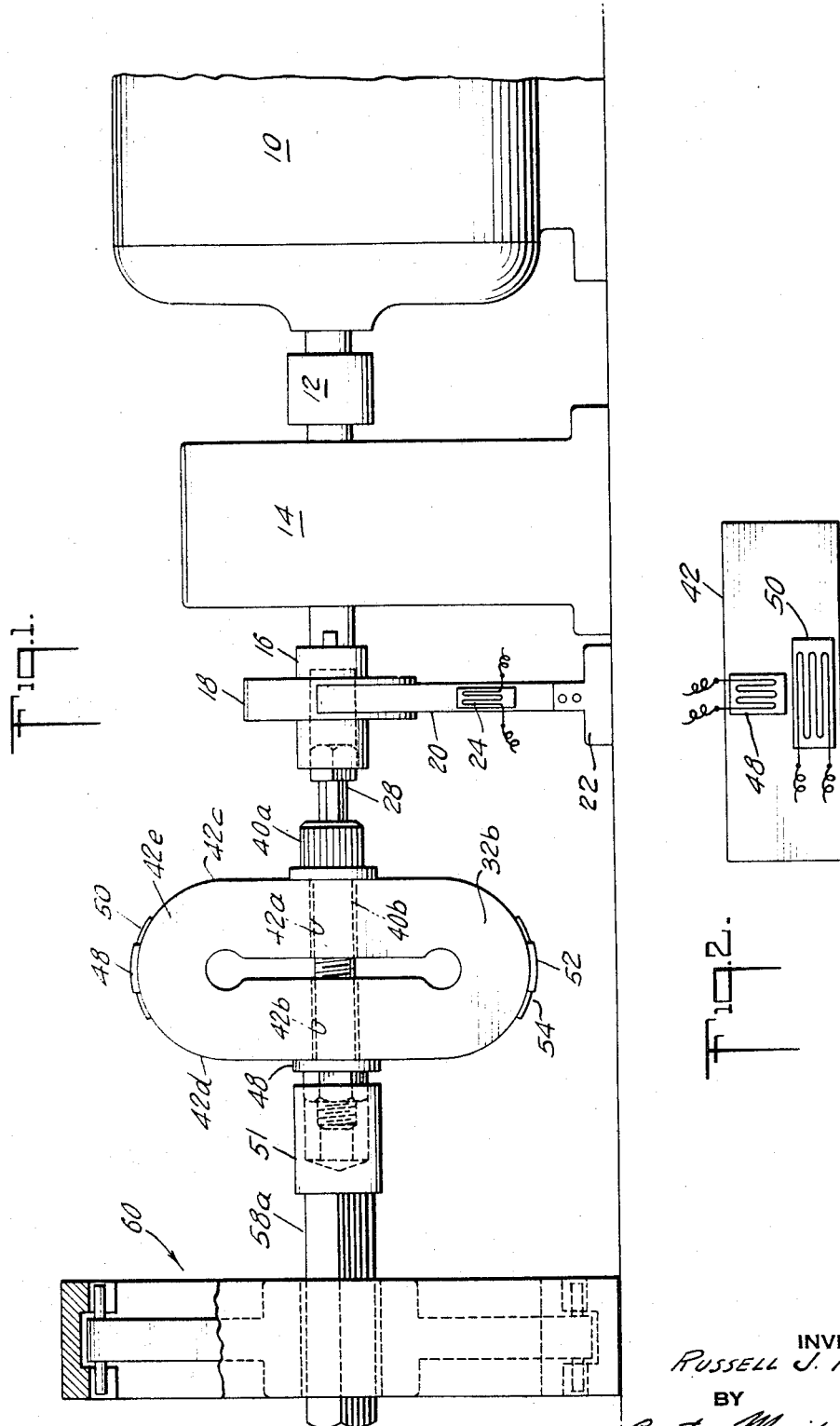
INVENTOR:
RUSSELL J. HARDIMAN
BY
Curtis, Morris & Safford
ATTORNEYS.

April 29, 1969     R. J. HARDIMAN     3,440,869
THREADED FASTENER TESTING APPARATUS
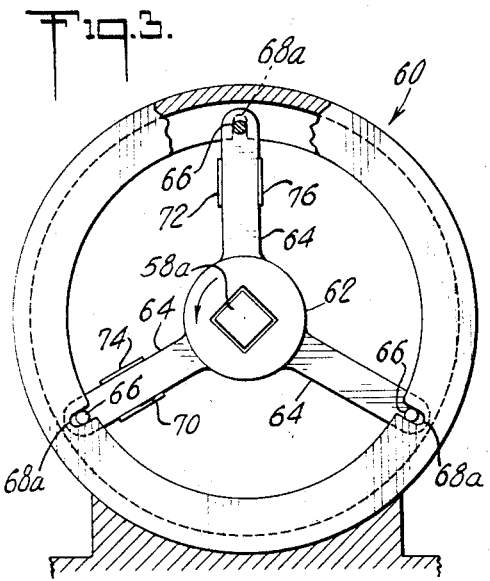
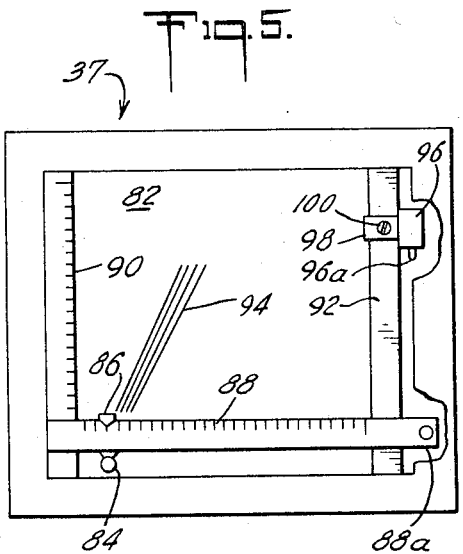
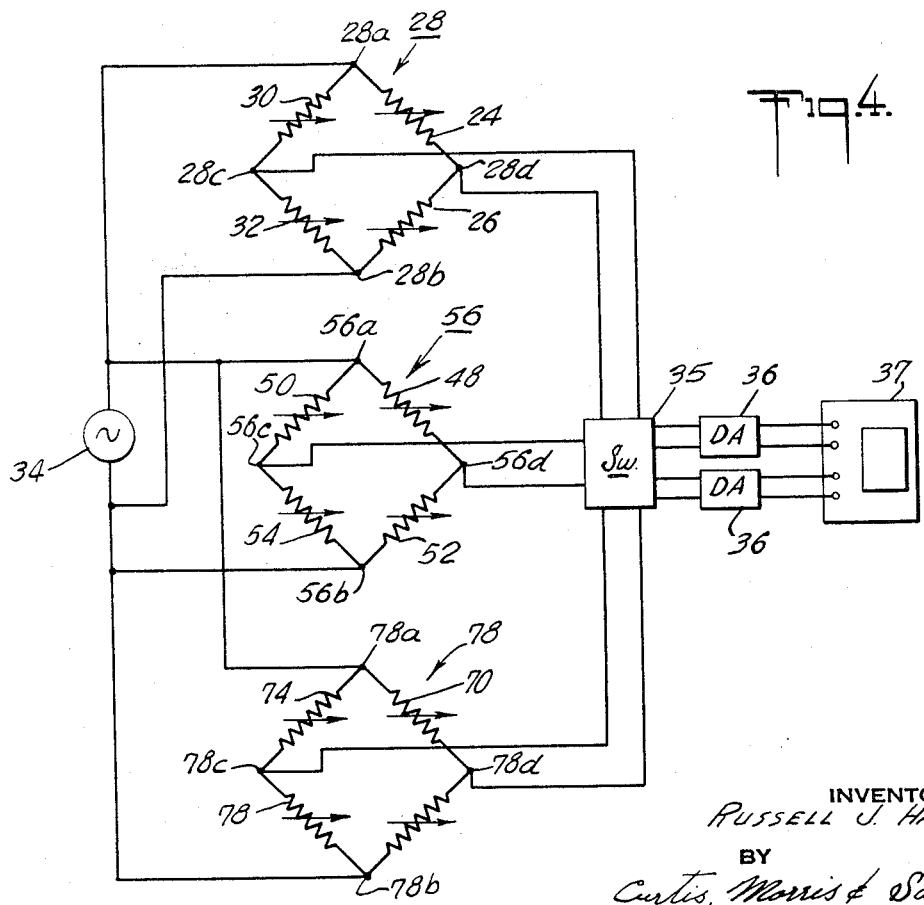
INVENTOR:
RUSSELL J. HARDIMAN
BY
Curtis, Morris & Safford
ATTORNEYS.

3,440,869
THREADED FASTENER TESTING APPARATUS
Russell J. Hardiman, Willow Grove, Pa., assignor to Standard Pressed Steel Co., Jenkintown, Pa.
Filed Nov. 4, 1966, Ser. No. 592,225
Int. Cl. G01l 7/16
U.S. Cl. 73—89                                    5 Claims

ABSTRACT OF THE DISCLOSURE

Threaded fastener testing apparatus having a tension responsive element in the shape of a flattened ring with coaxial openings in its opposed legs through which the male fastener element extends so that tightening of the fastener presses the legs together and with strain gauges attached to the ring to measure its flexure as indicative of the tension on the fastener. One of the fastener elements is driven by an electric motor through a drive train including a constant rise cam actuating a resilient cantilevered member having a strain gauge attached to it to measure the flexure of the member as indicative of the angular position of the movable fastener element. The fixed fastener element is coupled to the rotor of a torque measuring assembly having radial arms extending outwardly to a stator, with strain gauges attached to the arms to measure the flexure of the arms as indicative of the torque. X-Y coordinate indicating and/or recording means is provided with an input switch for selecting any two of the three variables, torque, tension and angular position, to be plotted as a function of one another. Automatic means for recycling the motor drive when a predetermined value of one of the variables is reached is provided for automatically operating the apparatus through a desired number of cycles.

---

This invention relates to apparatus for testing threaded fasteners and, more particularly, for providing a measurement of the torque imposed thereon, the resulting tension induced therein, and/or the angle of rotation of one fastener element relative to the other.

The invention also provides means for presenting these data in the form of a coordinate graph, for example, either on a storage oscilloscope or an X-Y recorder, with any selected one of the three variables (tension, torque or angle of rotation) plotted as a function of either selected one of the two others. It may also provide means for automatic repetition of the fastening cycle to show changes in the relationship of these variables upon re-use of the fastener.

The test apparatus of the present invention is of a mechanically simple configuration which minimizes the possibility of introducing errors due to the strain and hysteresis of mechanical linkages extrinsic to the fastener element under test. The test apparatus also has high sensitivity and good accuracy and repeatability.

In general terms, these desirable objectives are achieved in part through an arrangement whereby both the torque imposed on the fastener and the resulting tension induced therein produce bending of flexure elements to degrees varying in direct relation with the torque and tension. The degree of bending of these flexure elements is measured by means of strain gage elements bonded thereto and connected to the indicator means. The mechanical conversion of both tension and torsion into simple flexure of the strain elements affords a more accurate and linear output signal than systems in which the strain elements are subjected to torsional stresses or various complex combinations of stress components which may produce unpredictable strain effects, particularly as the elements undergo fatigue, creep and other irreversible changes over extended periods of use.

The mechanical conversion of relative rotation of the fastener elements into flexure of still another strain element whose degree of flexure is also measured by a strain gage, permits this third variable also to be readily measured and read out on the same indicating means in correlation with either of the other two variables.

In the drawings:

FIGURE 1 is a somewhat diagrammatic side elevational view of the mechanical components of an illustrative test apparatus embodying features of the invention;

FIGURE 2 is a somewhat diagrammatic end elevational view of the tension-responsive element of the apparatus of FIGURE 1;

FIGURE 3 is a somewhat diagrammatic end elevational view, at slightly reduced scale, of the torque-responsive element of the apparatus;

FIGURE 4 is a schematic diagram of the electrical circuit by which the strain gage elements are connected to the indicating means; and FIGURE 5 is a somewhat schematic representation of an X-Y recorder including an adjustable limit switch for automatic recycling of the driving means of the apparatus.

The illustrative apparatus shown in FIGURE 1 includes a variable speed, reversible electric motor 10 whose drive shaft is connected through a flexible coupler 12 to the input of a speed reducer 14 to afford a high-power, low-speed output (for example, 20,000 inch-pounds of torque at a speed range of 1 to 20 r.p.m.).

The output shaft of the speed reducer 14 is keyed in a coupling sleeve 16 on which is fixed a constant-rise cam 18. Riding on the cam 18 is a resilient flexure member 20 which is cantilevered from a support bracket 22. Bonded to one face of the flexure member 20 is an electrical resistance strain gage 24 which is placed under compression when the flexure member 20 is flexed outwardly due to rotation of the cam 18. Bonded to the opposite face of the flexure member 18 is a similar strain gage 26 (shown only in the schematic electrical diagram of FIGURE 4), which is placed under tension when the flexure member 20 is flexed outwardly.

As shown in FIGURE 4, these strain gages 24 and 26 are connected in a conventional Wheatstone bridge circuit, generally designated 28, which also includes, in its so-called "ratio arms," a pair of compensating resistors 30 and 32. The input terminals 28 and 28b of the circuit are connected to an electrical source 34, for example a signal generator developing a 25-kc., 5-volt signal. The output terminals 28c and 28d of the circuit are connected to the input of a selector switch 35 which is used to connect the output selectively to the input of either of two detector-amplifier circuits 36 whose outputs are respectively connected to the horizontal and vertical input terminals of the indicating device 37 which, for example, may be either a recording oscilloscope or an X-Y recorder.

As will be understood, the amplitude of the signal fed to the indicating device is proportional to the difference in the resistances of the two strain gages 18 and 20, which in turn is dependent upon the degree of flexing of the flexure member 20, which in turn varies with the angular position of the cam 18 and the driven fastener element.

In the particular embodiment illustrated, the cam 18 makes one revolution for each revolution of the driving means. Thus, during the preliminary run-in of the fastener to seated position, the cam would normally make several revolutions, so that the output signal of the electrical circuit would vary through several cycles. However, the indicator means may be switched off during this run-in operation and switched on only after the fastener has seated, so that the measured angle of rotation is less than 360° (that is, less than the angular extent of the linear rise portion between the low point and the high point on the cam). Alternatively, where it is desired, for example, to measure the torque during run-in versus the angle of rotation, the cam 18 may be driven through a reducing gear so that it makes less than a 360° revolution for whatever number of revolutions the driving means makes during the run-in.

The output end of the coupling sleeve 16 is provided with a square bore in which the square head 38a of interchangeable wrench 38 is slidably received. The wrench 38 is selected to fit the adjacent element of the particular fastener element under test (in the illustrated case, the head 40a of a socket-head cap screw) and the sliding relation between the head 38a of the wrench and the bore of the sleeve 16 permits axial movement of the wrench to engage and disengage the fastener element at the start and conclusion of the test, as well as interchanging of wrenches as required for engaging different types and sizes of fastener elements.

The shank 40b of the male fastener element under test extends through coaxial bores 42a and 42b in the opposed leg portions 42c and 42d of a tension-responsive strain element, generally designated 42, in the shape of a flattened ring which includes a pair of opposed, U-shaped sections in which the parallel leg portions 42c and 42d are joined together at each end by curved base portions 42e and 42f. The inner shoulder of the head 40a bears against one side of the strain element 42 through a washer 34 while the inner face of the mating fastener element of the fastener assembly under test (in the illustrated case, a hexagonal nut 46) bears against the opposite side of the strain element through a washer 48.

As the fastener is tightened, pressure is thus exerted on the strain element 42, causing its leg portions 42c and 42 to be squeezed together and its base portions 42e and 42f to be flexed. As best shown in FIGURE 2, bonded to the outer surface of the base portion 42e are a pair of electrical resistance strain gages 48 and 50, the gage 48 extending transversely of the periphery of the strain element 42 and the gage 50 extending parallel thereto. As may be seen in FIGURE 1, another pair of strain gages 52 and 54 is mounted in similar fashion to the opposite base portion 42f.

As shown in FIGURE 4, these four strain gages 48, 50, 52 and 54 are connected in a conventional Wheatstone bridge circuit, generally designated 56, whose input terminals 56a and 56b are connected to the electrical source 34 and whose output terminals 56c and 56d are connected to the input of the selector switch 35 for selective connection through one of the detector-amplifier circuits 36 to either the horizontal or vertical input terminals of the indicating device 37.

As will be understood, the amplitude of the output signal of this circuit 56 is proportional to the degree of compression of the strain member 42 which in turn is proportional to the tension imposed on the fastener under test.

Referring again to FIGURE 1, the nut 46 is slidably received in a socket wrench 58 having a square shaft 50a which slidably projects through a square opening in a torgue-responsive assembly generally designated 60. As best shown in FIGURE 2, the torque-responsive assembly 60 includes a rotor member 62 which is provided with a square opening 62a in which the shaft 58a of the wrench 58 is slidably received but is keyed against relative rotation. Projecting radially outward from the rotor member 62 are three flexure webs 64 whose outer ends carry transversely projecting pins 66 which are received in radial slots in a fixed stator ring 68 to prevent rotation of the outer ends of the flexure webs 64 while permitting them the limited radial movement attendant upon their flexing.

As will be understood, as the fastener is tightened, a reactive torque is imposed on the wrench 58, which is transmitted through the shank 58a to the rotor 62, causing flexing of the flexure webs 64 and placing the leading edge of each web under tension and its trailing edge under compression. Bonded to the leading edges of two of the flexure webs 64 are a pair of electrical resistance strain gages 70 and 72 and bonded to the trailing edges of these webs are two similar strain gages 74 and 76. As shown in FIGURE 4, the strain gages 70 and 72 are connected in opposite arms of a Wheatstone bridge circuit and the strain gages 74 and 76 are connected in the other two arms. The input terminals 78a and 78b of the circuit are connected to the source 34 while the output terminals 78c and 78d are connected to the input of the selector switch 35 for selective connection through either of the two detector-amplifier circuits 36 to either the horizontal or vertical input terminals of the indicator 37. Thus, the output signal of the circuit 78 is proportional to the degree of flexure of the webs 64, which in turn is proportion to the torque imposed on the fastener.

The selector switch 36 thus makes possible the selection of any two of the three available signal inputs to be ploted versus one another by the indicator 37.

FIGURE 5 shows, somewhat diagrammatically, a conventional X–Y recorder, generally designated 80, which has been modified to incorporate a control means for automatic recycling of the test apparatus. This recorder is provided with graph paper 82, which may be a section of a roll of paper supported for movement on rollers (not shown) so that it may be indexed to present successive fresh sections for recording.

The recording pen 84 is supported on a pen assembly 86 which is horizontally movable along a carriage bar 88 whose opposite ends are supported for vertincal movement on a pair of parallel vertical columns 90 and 92. As is well known, the horizontal movement of the pen assembly 86 along the carriage bar 88 is controlled by the horizontal input signal to the recorder, and the vertical movement of the carriage bar 88 along the columns 90 and 92 is controlled by the vertical input signal, so that the pen 84 will trace on the graph paper 82 coordinate plots 94 of the two input signals as a function of one another.

Mounted on the vertical column 92 is a limit switch 96 which is supported on a mounting bracket 98 which is vertically slidable along the column 92 and which is held in the desired vertical position by a set screw 100. The plunger 96a of the switch 96 is arranged so that it is engaged and depressed by the upper edge 88a of the carriage arm 88 when it reaches a height depending upon the vertical position of the switch 96. The switch 96 controls a relay (not shown) in the power supply circuit of the reversible driving motor 10 (FIGURE 1) so that actuation of the switch causes the motor 10 to be driven in the reverse direction to loosen the fastener. By means of another limit switch (not shown) engaging the cam 18 (FIGURE 1), the connections to the motor 10 can be reversed again, restarting the motor in the forward direction for re-tightening the fastener when the starting point is again reached.

Thus the test apparatus will be automatically recycled, alternately tightening the fastener to a predetermined angle of rotation, or a predetermined torque, or a predetermined tension, as controlled by the setting of the selector switch 35 (FIGURE 4) and the position of the limit switch 96 (FIGURE 5), then loosening the fastener back to the starting point, then repeating this cycle any desired number of times, and furnishing a coordinate plot of the two selected variables during each cycle.

While the test fastener illustrated in FIGURE 1 (a socket head cap screw) is shown with the head 40a of the screw driven by the motor 10 and the nut 46 coupled to the torque-responsive assembly 60, the positions of the screw and nut may be reversed merely by changing the wrenches 28 and 58. Moreover, instead of tightening the fastener by means of the internal motor 10, the fastener element which is exposed (that is, the one not engaged by the torque-responsive assembly) may be engaged and driven by a hand-held motor-driven wrench or nut driver, for example, of either the electrical or air-driven and either the continuous drive or impact type. The test apparatus desirably may be provided with two different test stations, one of the internal motor-driven types shown in FIGURE 1 and another which is similar except that the drive means are omitted and the axis of the fastener is oriented so that the exposed fastener element is presented at the exterior of the machine for ready access to a hand-held wrench, such as a motor powered nut driver.

In both types of test assembly, and particularly where a hand-held wrench is used, it is desirable to support the tension-responsive member 42 against transverse movement so that it is held in place when no fastener is in the assembly and so that no transverse moment is imposed upon the torque-responsive assembly. Such support is suitably provided by a circular plate fastener to the tension-responsive member 42 adjacent its central axis (so as not to interfere with its flexing), this plate being cradled in a roller-bearing support which prevents transverse movement of the assembly while permitting its limited rotational movement (for example, through a 2° angle) as required for proper operation of the torque-responsive assembly.

It will therefore be appreciated that the present invention provides a practical apparatus by which the aforementioned and other apparent desirable objectives have been achieved. However, it should be emphasized that the particular embodiment of the invention is intended as merely illustrative of the general principles of the invention rather than as restrictive of the scope thereof, which is defined and limited only by the appended claims.

What is claimed is:

1. A threaded fastener testing apparatus comprising a tension-responsive member having at least one generally U-shaped portion with two spaced legs joined together by a curved base, said legs being provided with coaxial openings through which the male fastener element extends with the outer surfaces of said legs being respectively engaged by the head of the male fastener element and the inner face of the female fastener element, whereby said legs are pressed toward one another as the mating fastener elements are tightened to place the male fastener element under tension, first strain gauge means bonded to said tension responsive member, means to rotate one of said fastener elements, a rotor member adapted to be coupled to the other of said fastener elements for at least limited rotary movement therewith, a stator member fixed against rotation, at least one torque-responsive member extending between said rotor member and said stator member, whereby torsion of said rotor member causes flexing of said torque-responsive member, second strain gauge means bonded to said torque-responsive member, and an X–Y coordinate recorder having its X and Y inputs connected to said first and second strain gauge means to plot a coordinate graph of the torque and tension of said fastener elements as a function of one another.

2. A threaded fastener testing apparatus comprising a tension-responsive member having at least one generally U-shaped portion with two spaced legs joined together by a curved base, said legs being provided with coaxial openings through which the male fastener element extends with the outer surfaces of said legs being respectively engaged by the head of the male fastener element and the inner face of the female fastener element, whereby said legs are pressed toward one another as the mating fastener elements are tightened to place the male fastener element under tension, first strain gauge means bonded to said tension-responsive member, means to rotate one of said fastener elements, said means including a rotary shaft bearing a graduated cam, a flexure member flexed by said cam, and having a second strain gauge means bonded thereto, an X–Y coordinate recorder having its X and Y inputs connected to said first and second strain gauge means to plot a coordinate graph of the angle of rotation of said shaft and of said fastener element and the induced tension, as a function of one another.

3. A threaded fastener testing apparatus comprising a tension-responsive member having at least one generally U-shaped portion with two spaced legs joined together by a curved base, said legs being provided with coaxial openings through which the male fastener element extends with the outer surfaces of said legs being respectively engaged by the head of the male fastener element and the inner face of the female fastener element, whereby said legs are pressed toward one another as the mating fastener elements are tightened to place the male fastener element under tension, first strain gauge means bonded to said tension-responsive member, means to rotate one of said fastener elements, said means including a rotary shaft bearing a graduated cam, a flexure member flexed by said cam, a second strain gauge means bonded to said flexure member, a rotor member adapted to be coupled to the other of said fastener elements for at least limited rotary movement therewith, a stator member fixed against rotation, at least one torque-responsive member extending between said rotor member and said stator member, whereby torsion of said rotor member causes flexing of said torque-responsive member, third strain gauge means bonded to said torque-responsive member, and coordinate indicating means having X and Y inputs selectively connectible to said first, second and third strain gauge means to indicate any selected two of said three variables (angle of rotation, torque and tension) as a function of one another.

4. A threaded fastener testing apparatus comprising a tension-responsive member having at least one generally U-shaped portion with two spaced legs joined together by a curved base, said legs being provided with coaxial openings through which the male fastener element extends with the outer surfaces of said legs being respectively engaged by the head of the male fastener element and the inner face of the female fastener element, whereby said legs are pressed toward one another as the mating fastener elements are tightened to place the male fastener element under tension, first strain gauge means bonded to said tension-responsive member, reversible motor-driving means for rotating one of said fastener elements, a rotor member adapted to be coupled to the other of said fastener elements for at least limited rotary movement therewith, a stator member fixed against rotation, at least one torque-responsive member extending between said rotor member and said stator member, whereby torsion of said rotor member causes flexing of said torque-responsive member, second strain gauge means bonded to said torque responsive member, coordinate indicating means having X and Y inputs connected to said first and second strain gauge means for giving a visual indication in X–Y coordinate form of said variables (torque and tension) as a function of one another, first sensing means associated with said indicating means and connected to control said reversible motor-driving means when one of said variables reaches a preselected value to cause reversal of said motor-driving means for rotation of said one fastener element back to a predetermined starting position, and second sensing means responsive to the position of said motor-driving means and connected to control said motor-driving means, and operable when said predetermined starting position is reached to cause said motor-driving means to drive said one fastener element again in the first mentioned direction, whereby said apparatus will automatically recycle.

5. Apparatus as claimed in claim 4 in which said coordinate indicating means is an X–Y recorder having a vertically movable carriage for plotting the Y coordinate and said first sensing means is a vertically adjustable electrical switch adapted to be actuated when said carriage reaches a height corresponding to a value for the Y variable determined by the vertical position to which said switch is adjusted.

References Cited

UNITED STATES PATENTS

| | | | |
|---|---|---|---|
| 2,030,464 | 2/1936 | Nilson | 73—95 X |
| 2,403,952 | 7/1946 | Ruge. | |
| 2,586,708 | 2/1952 | Petit | 73—99 |
| 2,712,645 | 7/1955 | Keene. | |
| 2,880,409 | 3/1959 | Gallentine | 73—88.5 X |
| 2,957,342 | 10/1960 | Hanneman | 73—16 X |
| 3,354,705 | 11/1967 | Dyer | 73—95 |

FOREIGN PATENTS

| | | |
|---|---|---|
| 882,989 | 11/1961 | Great Britain. |
| 142,461 | 1/1960 | U.S.S.R. |

RICHARD C. QUEISSER, *Primary Examiner.*

J. W. MYRACLE, *Assistant Examiner.*

U.S. Cl. X.R.

73—137, 95